United States Patent [19]

Magnino et al.

[11] 3,852,503
[45] Dec. 3, 1974

[54] METHOD OF MAKING PUDDINGS CONTAINING SOY PROTEIN

[75] Inventors: Pete Joseph Magnino, St. Louis; Ralph Anthony Hoer, Ballwin, both of Mo.; Robert Erick Hahn, Edwardsville, Ill.

[73] Assignee: Ralston Purina Company, St. Louis, Mo.

[22] Filed: Jan. 10, 1973

[21] Appl. No.: 322,461

Related U.S. Application Data

[63] Continuation-in-part of Ser. No. 219,156, Jan. 19, 1972.

[52] U.S. Cl. .................................................. 426/364
[51] Int. Cl. ............................ A23j 3/00, A23l 1/14
[58] Field of Search ....... 99/14, 17, 139; 260/123.5; 426/364

[56] References Cited
UNITED STATES PATENTS

| | | | |
|---|---|---|---|
| 3,642,490 | 2/1972 | Hawley et al. | 99/17 |
| 3,645,745 | 2/1972 | Magnino et al. | 99/17 |
| 3,649,293 | 3/1972 | Hoer et al. | 99/17 |
| 3,689,288 | 9/1972 | Duren | 99/139 |

OTHER PUBLICATIONS

Altschul, "Processed Plant Foodstuffs," (1958), pp. 408–410.

*Primary Examiner*—James R. Hoffman
*Attorney, Agent, or Firm*—W. Dennis Drehkoff; Virgil B. Hill; Lawrence J. Hurst

[57] ABSTRACT

The preparation of an improved acid stable isolated vegetable protein food product, preferably an isolated soy protein food product, having excellent solubility in an acid media is disclosed. The method of preparing this product includes forming a slurry of the isolated protein in water, the slurry having a pH of between 2.0 and 4.2, heating the slurried material practically instantaneously to elevated temperatures preferably by ejecting the slurry material from a nozzle while injecting steam into it. The slurried material is retained at the elevated temperatures and under an elevated positive pressure for a brief, controlled time interval to inactivate the trypsin inhibitor therein, destroy spore forming bacteria and render the protein more soluble in an acid pH range. Then suddenly releasing the pressure to cause flash off volatilization of the vapor for cooling to thereby leave a slurry of sterilized, acid soluble isolated protein material, which is heat stable in a low pH range, and then preferably drying the slurry to a powder. The prepared acid soluble isolated vegetable protein product may then be utilized in preparing acidic products such as pudding, sour cream, candy etc.

6 Claims, No Drawings

METHOD OF MAKING PUDDINGS CONTAINING SOY PROTEIN

BACKGROUND OF THE INVENTION

This is a continuation-in-part of our copending application entitled, "Protein Food Product and Method of Forming Same" filed Jan. 19, 1972, Ser. No. 219,156.

This invention relates to the preparation of vegetable protein food products of controlled high acid stability, and more particularly to a method of preparing an improved acid soluble isolated vegetable protein food which is heat stable in low pH ranges and food products made therefrom.

This invention was conceived and developed largely for soy materials because of the special problems encountered with such materials. Therefore, it will be explained largely with respect to soy materials, and has special application to such materials, although it can be used for other vegetable protein materials in the broader aspects of the invention.

The preparation of vegetable protein products from a variety of sources and by a variety of processes is known, including that of soy protein products. Primarily isolated soy protein is used and is obtained from oil extracted soy meal. If such products from soy materials are prepared for human or animal consumption, they are normally designated "edible" soy protein. The product of the present invention is high in protein content and has a substantial food potential especially in highly acidic products. Particularly, the product of the present invention has improved acid stability whereby the product may be utilized in acidic foods and in fact may be subjected to a heat treatment on the acid side of the isoelectric point of the material, about pH 4.6 for soy protein, and the protein will not precipitate during the heat treatment.

As is known to those skilled in the processing of soy material, and to purchasers and potential purchasers, difficulty has been encountered when attempting to use soy protein material in a highly acid media due to lack of heat stability of the protein material in low pH food applications.

In assignee's copending application, Ser. No. 625,980, filed Mar. 27, 1967, now U.S. Pat. No. 3,642,490, which generally relates to a treatment of soy isolate in order to obtain a blandness thereof, it was believed that when utilizing a pH in the range suggested by applicants herein that the dispersibility of the final product would be adversely effected. Contrary to this, it was unexpectedly found that by carefully controlling the pH of the isolate protein material to between 2.0 and 4.2 followed by the treatment hereinafter described that an improved acid stable protein product for use in food products was obtained. Further the acid soluble protein product of the present application showed improved characteristics over isolated protein material which was adjusted to the critical pH range of 2.0 – 4.2 but not subjected to the remainder of applicant's process.

Additionally, the acid stable isolated protein material could be utilized in preparing acidic foods, such as an acidic pudding in the pH range of about 2.8 – 4.2, which was heretofore extremely difficult to achieve.

SUMMARY OF THE INVENTION

The major object of this invention is to provide a method of processing isolated vegetable protein and particularly isolated soybean materials to form an acid stable isolated protein product which is heat stable in a low pH range, to such an extent that the product can even be freely used in the preparation of low pH puddings when aseptically canned.

Moreover, the novel soy treating process can be operated on an automated continuous flow basis, with a minimum of operating personnel, and with a high production output rate.

The unique processing steps are preferably used after certain preliminary steps are conducted on soybean materials. Because these unique processing steps are preferably employed in combination with certain preliminary steps, and because it is desired to explain the entire process in detail, the invention will be explained herein by describing the operation from the beginning.

DESCRIPTION OF PREFERRED EMBODIMENTS

This operation will be described with respect to soybean and edible soy protein products because this was the prior area of concern for which the process was discovered, and because the process is particularly suited for forming the desired acid soluble isolated soy protein product which is heat stable when used in a low pH range.

In brief outline of the total process, the soybeans forming the starting material are ground or crushed, the oil is extracted to leave soybean meal or flakes, the proteins and sugars are dissolved out of the flakes into solution, the proteins are precipitated out of the solution, washed, and put into water suspension as a slurry. The slurry is given a controlled pH range of between 2.0 and 4.2 and a controlled range of solids content. It is then heated to a controlled elevated temperature range, and held at controlled elevated temperatures under positive pressure to prevent vaporization for a brief, controlled time interval to inactivate the trypsin inhibitors therein and to solubilize the protein during the heating and holding. Then the pressure is suddenly released to instantly volatilize part of the moisture and cause a partial cooling of the slurry. The slurry is then preferably but not necessarily dried to a powder which has high acid solubility and which is heat stable in a low pH range.

More specifically, the soybeans are crushed or ground in convenient fashion, and passed through a conventional oil expeller. The oil is preferably removed by solvent extraction, using solvents normally employed for this purpose.

The resulting solids, commonly referred to as high DPI soybean flakes, contain many ingredients including complex proteins, sugars, fibers, and others. The proteins and sugars are then preferably dissolved out of the solids. This may be done by adding the flakes to an aqueous bath and adding a food grade alkaline material to raise the pH substantially above 7. Typical of such alkaline reagents is sodium hydroxide, potassium hydroxide, calcium hydroxide or other commonly accepted food grade alkaline reagents. The material is then extracted for a period of time sufficient to put the proteins and sugars in solution, usually about 30 minutes or so. The resulting liquor solution is separated from the solids, as by passing the material through a screen and/or centrifuging. Preferably, the liquor is then cycled through a clarifier to remove tiny particles.

The soy proteins are then precipitated from the liquor by lowering the pH to an acidic value of the isoelectric point of the protein, usually pH of 4.6 – 4.9, with the addition of a common food grade acidic reagents such as acetic acid, phosphoric acid, citric acid, tartaric acid, or others. The precipitate is then separated as by centrifuging, and washed with water to remove remaining sugars, except for a minute trace which is practically impossible to remove. The precipitate or curd is then made into an aqueous slurry by adding water. The slurry, as prepared in accordance with the above, forms the most desirable product with respect to the characteristics presently sought.

This slurry or curd can then be further processed as described in detail hereinafter. However, it is significant to note that this slurry of isolated soy protein can alternatively be dried, and then subsequently rehydrated and further processed in the same manner, as described hereinafter. Drying of the isolated soy protein is preferably by a flash dry technique such as spray drying or the equivalent, due to retention of redispersion capacity. The dried material may be stored for a period of time or immediately reslurried for further processing. It has been found that the dried-reslurried material results in a slightly different final product than the final product resulting when the isolated protein slurry is directly processed further. The technical explanation of this is not fully understood. The final product from the dried-reslurried isolated soy protein is slightly inferior.

The slurry or curd than has its pH adjusted. This is important in order to obtain a final product with the improved acid solubility and which is heat stable in a low pH range. Specifically, it is necessary that the pH be adjusted to a range of about 2.0 to about 4.2, and preferably between about 3.0 and 3.5. Below about 2.0, a very astringent final product is produced with a high ash content. At a pH above about 4.2, the curd or slurry tends to fibrillation of the product during the subsequent heat treatment. The pH may be easily adjusted by adding a food grade acid reagent such as phosphoric acid, lactic acid, citric acid, malic acid or a combination thereof to get the desired pH of between 2.0 to 4.2.

The slurry to be further processed should have a controlled solids content of about 3 – 20 percent by weight, and preferably about 10 – 15 percent by weight. If it falls below about 3 percent, subsequent processing steps are not economically advisable when a continuous process is employed. Drying is particularly costly. Above about 15 percent solids content, the resulting product does not subsequently lend itself to the preferred flash drying techniques, such as spray drying using a jet or spinning thrower, so that other drying techniques must be employed, to result in a product that is not as desirable in its functional characteristics. Above about 20 percent solids content, the viscosity of the slurry during processing becomes very high and makes processing difficult.

This slurry is then subjected to heating to an elevated temperature range of about 250° – 320° F. and preferably 285° – 310° F. Currently, the most satisfactory way of achieving this is to pass the slurry through a device commonly known as a Jet Cooker. It includes adjacent jet nozzle orifices, normally concentric, through which the slurry and the pressurized steam used as a heating agent are ejected at high velocities in intersecting flow patterns, so that the slurry is instantly heated by the steam. If higher temperatures than about 320° F. are used, a shorter time for holding the product must be utilized, otherwise the ultimate product will tend to develop a scorched flavor. The lower temperature utilized should be sufficient to destroy the bacteria spores or inactivate the trypsin inhibitor or urease activity.

The product is introduced to the jet cooker nozzle at a positive pressure. This pressure should be at a value near the pressure of the steam injected into the slurry, should be sufficient to cause high velocity discharge of the slurry through the jet nozzle, and must be greater than the pressure in the special retention chamber immediately downstream of the nozzle. Normally the steam pressure is about 80 – 85 psig, with the slurry line pressure being substantially the same as the steam pressure, when the injection occurs, and the discharge pressure in the chamber downstream of the nozzle is about 75 – 80 psig. The pressure drop of the slurry across the nozzle is about 5 – 15 psi, depending upon these other pressures, with 6 – 10 psi being common.

The time interval of the slurry in the nozzle is estimated to be about one second or less. The nozzle orifice for the slurry is small, being only a fraction of an inch, e.g., about ⅛ inch, so that the steam intermixes intimately with the solids during the heating. The amount of steam required is not great, normally being an amount to lower the solids content of the slurry about 1 – 2 perent by weight.

Preferably the nozzle orifices are concentric, with the slurry being ejected from the center orifice, for example, and the steam from a surroundng annular orifice oriented to cause its output flow path to intersect the flow path of the cener orifice. The slurry and steam could be ejected from the alternate orifices however. Further, the adjacent orifices need not necessarily be concentric to obtain this interaction.

As noted previously, the steam and slurry are ejected into a special retention chamber. This may comprise an elongated tube through which the intermixed slurry and steam moves from the jet nozzle on one end of the tube to a pressure controlled discharge on the other end. The discharge can be controlled by a conventional pre-set pressure release valve to enable continuous process flow from the nozzle to and out of the discharge valve. This valve regulates the pressure in the holding chamber. This chamber pressure must be great enough to prevent any significant vaporization of the moisture in the chamber, even though the temperature is well above the boiling point of water. A pressure of about 75 – 80 psig readily achieves this. Since slurry and steam must continuously flow into this pressurized chamber, the pressure behind the slurry and the steam must be greater than the chamber pressure to cause this continuous flow.

The heated slurry is retained in the holding chamber for a definite but relatively short time period, normally of about 10 seconds to about 30 seconds. It is only necessary to retain the product in this heated condition for a few seconds to insure that the heating is sufficient to inactivate the trypsin inhibitors or urease activity in the slurry, to destroy spore forming bacteria and to render the protein more soluble in an acid pH range. The retention time and temperature to which the slurry is heated may be adjusted by those skilled in the art to obtain other operating conditions for effecting the inactivation of the trypsin inhibitors or urease activity in the slurry, the destruction of spore forming bacteria and the improvement of solubility.

The pressure on the slurry is then instantly released by discharging the slurry to a reduced pressure zone, into a suitable receiving means. This causes flash off vaporization of a portion of the moisture in the form of water vapor which causes substantial cooling of the remaining slurry because of the heat of vaporization absorbed from the slurry, so that the total time which the product is subjected to elevated temperatures is very short and controlled. However, the rapid cooling of the slurry is not critical to the acid solubility of the final product. The vapors may be removed so that there is no condensation of substances in the vapors back into the slurry. This is not absolutely necessary since the high acidity of the product serves to mask or cover the flavor thereof. Further, the product is completely sterilized by this treatment because of the substantially elevated temperatures here involved, and the intimate mixture of the hot steam with the slurry. The reduced pressure zone into which the slurry is discharged is preferably subatmospheric, i.e., at a partial vacuum but may be discharged into atmospheric pressure. The pressure release is effective to instantly lower the temperature of the product to below 212° F. By discharging into a vacuum it is possible to get a more rapid cooling of the slurry.

Other alternative apparatus which may be used for heat includes apparatus emloying radio frequency heating and agitation, spiral therm heater apparatus, electrostractic heating apparatus, super sonic wave devices, film diaphragm vibration equipment, and reso-jet resonating flame apparatus. In fact, one or more of these devices could be used individually or combined with the jet cooker to achieve the desired heating.

The resulting slurried product can then be used directly for food products. Alternatively, it can be dried, with the dried product having excellent solubility in an acid media.

If the slurry is dried, preferably the product is flash dried because of the uniform, fine, powderous product obtained, the economical continuous processing afforded thereby, and the excellent acid solubility characteristics of the powder. Of the flash drying techniques, spray drying is usually used. The product may be freeze dried, but is more costly. The product produced by the process exhibits excellent solubility in an acid media and is heat stable in a low pH range.

Although the inventive concepts will be readily understood from the foregoing description, by one having oridinary skill in this art, the following illustrative examples are given to assure a complete understanding.

EXAMPLE 1

A. Soybeans are ground and the oil extracted with hexane to give high DPI flakes. The flakes are added to an aqueous bath and a food grade alkaline reagent, sodium hydroxide, is added until a pH of 10 is reached. The material is extracted for 30 minutes, and then centrifuged. The soy protein material is precipitated from the liquor by adding acetic acid until the isoelectric point is reached at about a pH of 4.7. The precipitate is washed with water, and then added to water to make an aqueous slurry of 15 percent solids by weight.

B. The pH is then adjusted to 3.5 by adding phosphoric acid.

C. The slurry is then passed through a jet cooker under a pressure of 85 psig, simultaneously with steam ejection from the jet cooker under a pressure of 95 psig, into a pressure retention chamber at a pressure of 75 psig. The steam heats the slurry through the jet cooker to a temperature of 310° F. After 15 seconds, progressive portions of the heated slurry are suddenly discharged into a vacuumizer at 21 in. Hg. causing flash off cooling of the slurry. The vapors are separated from the slurry.

D. The slurry is flash dried in a spray drier to a moisture content of 3 percent.

As a comparison with the product prepared according to Example 1, products were prepared by (a) adjusting the pH of the slurry to 6.7 followed by the heating step as described in Step C and dried as in Step D and a 5 percent solution of this material was adjusted to pH 3.5 with phosphoric acid with a high degree of agitation and (b) merely adjusting the pH of the slurry to 3.5 without the heating step and spray dried as in Step D. The following test was conducted to determine the relative solubilities of the products.

Solubility Index

Disperse 4 grams of the protein product in 100 mls. of water with agitation in a Waring Blender Model No. 1120, for about 90 seconds. Centrifuge 50 mls. of the mixture for about 5 minutes at about 1,000 rpm. Remove all but about 5 mls. of the supernatant liquid, add water to make up volume up to 50 mls., shake gently and centrifuge again for 5 minutes at 1,000 rpm. The solubility index is expressed in terms of the amount of residue, expressed in mls., remaining undissolved. That is to say, the more the residue, the less soluble and less desirable the product. The relative solubility of products produced according to these processes are:

| Product Example 1 | — solubility index | 0.5 ml. |
| Product A | — solubility index | 7.0 ml. |
| Product B | — solubility index | 1.7 ml. |

EXAMPLE 2

The procedure of Example 1 was followed except in step B the pH of the slurry was adjusted to 2.0 by adding phosphoric acid. The product produced by this process was substantially the same as obtained in Example 1.

EXAMPLE 3

The procedure of Example 1 was followed except in step B the pH of the slurry was adjusted to 4.2 by adding citric and phosphoric acid. The product produced by this process was substantially the same as obtained in Example 1.

The resulting dry treated isolated protein product can then be effectively used to produce a freeze-thaw stable acidic pudding which has a pH in the range of less than 4.2 and preferably in the range of 2.8 – 4.2. Due to the improved acid solubility of the protein product it is possible to fabricate high acid protein puddings, such as the various fruit flavorings, without the destablization or coagulation of the protein which normally occurs in the preparation of such protein pudding products. Particularly, the treated isolated protein shows desirable stabilization in the pH range of 2.8 –

4.2 in contrast to the normal problems encountered wherein milk protein has a tendency to curdle in these low pH ranges and wherein egg yolks utilized as a protein source do not generally provide an economical protein source for imparting the desired eating characteristics to the pudding. However, it has been found that by utilizing the treated isolated protein in a range of approximately 1.0 – 4.5 percent on a dry weight basis of a pudding composition that a desirable pudding product may be prepared which is stable in the acid pH range of 2.8 – 4.2. In addition, the treated isolated protein supplies the nutritional protein requirements normally present in puddings prepared in the neutral pH range and also provides the mouth-feel and eating characteristics normally desirable with puddings made with milk. Further by utilizing the treated protein isolate the final pudding composition is provided with a creamy appearance rather than the more translucent or watered down appearance of pudding products prepared without the desirable milk solids content of approximately 6 percent. It should be realized that various types of ingredients may be utilized to form the pudding to which the treated isolate protein may be added, depending on the operator's preference, however the following represents the preferred formulations for forming the desired acid stable pudding composition contemplated herein.

| | |
|---|---|
| Moisture | 58 — 72% |
| Vegetable Gum | 0 — 0.3% |
| Modified Food Starch | 3.5 — 7.0% |
| Fat | 3.0 — 12.0% |
| Sugars | 12.0 — 24.5% |
| Treated Isolated Protein | 1.0 — 4.5% |
| Acid | 0 — 0.1% |
| Emulsifier | 0 — 0.3% |
| Salt | 0.05 — 0.25% |

Of course other modifications or changes may be made in the formulation described hereinabove to conform with the operator's desired result. However, it should be realized that if the treated protein is present in an amount above about 4.5 percent on a dry weight basis processing becomes difficult due to the increase of viscosity and therefore would probably represent an operative upper limit. More desirably, the treated protein will be present in the pudding composition in an amount of about 1.7 – 2 percent based on the dry weight basis. Also, for the most desirable product, the moisture content should be controlled within the range of 65 – 70 percent. The pudding mixture is then uniformly blended with a preferred method being, to add the acid with the addition of the treated isolated protein in order to maintain the pudding mixture in a high acid stage and to keep the protein from coagulating during the mixing thereof. The so-mixed pudding mixture will then have a paste-like consistency which is then subjected to a heat treatment. The heat treatment should consist of heating the pudding mixture to a temperature of between about 240° F. to 320° F. for a period of 45 seconds to about 3 seconds. This time and temperature of the heating is effective to provide a sterilized pudding composition and yet is not sufficient to deleteriously effect the starch or effect a thinning of the starch, such that the pudding composition will not set as well. Desirably the heating should be carried out at a temperature of about 285° F. for approximately 17 seconds. This heating may be carried out by any of the well known heating devices such as steam infusion, spiral therm or jet cooker. If desired, the pudding mixture may be homogenized prior to or after the heat treatment although this probably would not be necessary if the heating is done in a jet cooker due to the physical working to which the pudding mixture is subjected during the heating. Following the heating, the pudding composition should then be cooled as rapidly as possible to 100° F. or below. This rapid cooling is desirable to prevent the heating step from breaking down the thickeners employed in the pudding composition. Of course, if the homogenization step is utilized following heating, the temperature of the pudding mixture should be maintained slightly elevated to control the viscosity of the product during the homogenization and then the pudding composition should be cooled to below 100° F. as rapidly as possible. The material during the cooling stage is still in a pourable or paste-like consistency but is beginning to increase in viscosity or thickening. Desirably, the solids content of the material as it exists from the cooling step will be in the range of about 32 – 37 percent. However, it should be understood that the solids content of the material following the cooling step may be altered in accordance with the operator's preference to produce the final consistency of the product which is desired. Following the cooling, the pudding may then be packaged and refrigerated and/or frozen or if the pudding is being aseptically produced, the pudding may be canned and placed in a warehouse. The pudding so formed in the pH range of 2.8 – 4.2 was of good texture and consistency and did not exhibit a grainy texture as was experienced in producing an acid pudding using the soy protein prepared in accordance with the method of Example I of assignee's application Ser. No. 625,980.

EXAMPLE 4

A pudding mixture was formed having the following formula:

| | |
|---|---|
| Moisture | 62% |
| Vegetable gum | .2% |
| Modified Food Starch | 3.7% |
| Fat | 7.7% |
| Dextrose | 3.3% |
| Corn Syrup Solids | 4.4% |
| Sugar | 16.5% |
| Isolated Soy Protein Treated at pH 3.5 | 1.8% |
| Emulsifiers | .2% |
| Flavoring materials were added | .2% |

The pudding mixture was passed through a jet cooker to heat the mixture to 310° F. for 17 seconds and then rapidly cooled to 100° F. The pH of the pudding was 4.3 with the texture being smooth and exhibiting a good body appearance.

As a comparison soy protein isolate prepared in accordance with Example I of assignee's application Ser. No. 625,980 and adjusted to a pH of 4 was substituted in the pudding formula for the soy protein isolate treated in accordance with the present invention and a pudding was prepared as above. The pH of the pudding was 4.4 with the texture of this pudding being grainy.

It is now apparent that applicants have described a novel protein product and method of preparing same and that modifications and changes may be made in the product and process set forth herein by way of illustra-

We claim:

1. A process of forming a pudding which has a pH less than about 4.2 containing isolated soy protein comprising the steps of: (a) preparing isolated soy protein consisting of the steps of extracting protein and sugars from solvent extracted soybean material, separating the extracted liquor from the solid soybean material, adjusting the pH of the liquor to about the isoelectric point of the protein to precipitate the protein, and separating the precipitated protein from the residue of any remaining sugars and solid soybean material to obtain the isolated soy protein; and (b) thereafter forming an aqueous slurry of the isolated soy protein having a pH of about 2.0 to about 4.2 and a solids content within the range of 3 – 20 percent; practically instantly heating successive portions of the slurry to a temperature of about 250° – 320° F., subsequently retaining the slurry at said temperature range under positive pressure for at least a sufficient period of time to destroy the trypsin inhibitor therein and then suddenly releasing the pressure thereon, such sudden pressure release causing flash off volatilization and cooling of the aqueous slurry of isolated soy protein; and (c) blending approximately 1.0 – 4.5 percent on a dry weight basis of the isolated soy protein with a mixture of pudding ingredients, the blended mixture having a moisture content of approximately 65 – 70 percent, a pH less than about 4.2 and a starch content of approximately 3.5 – 7 percent on a dry weight basis, heating the blended mixture to a temperature of about 240° F. to about 320° F. for approximately 45 seconds to 3 seconds, and thereafter cooling the blended mixture to below 100° F. to form a pudding.

2. The process according to step (c) of claim 1 wherein the isolated soy protein is present in the amount of approximately 1.7 – 2 percent on a dry weight basis in the blended mixture of pudding ingredients.

3. The process according to step (c) of claim 1 wherein the blended mixture of pudding ingredients has a moisture content of approximately 65 – 70 percent and is heated to approximately 285° F. for 17 seconds.

4. The process according to step (c) of claim 1 wherein the pH of the blended mixture of pudding ingredients is maintained between approximately 2.8 – 4.2.

5. The process according to step (b) of claim 1 wherein the pH of the slurry of isolated soy protein during the heat treatment is maintained between approximately 3.0 and 3.5 and the slurry has a solids content in the range of 10 – 15 percent.

6. The process according to claim 5 wherein the slurry of isolated soy protein is heated to a temperature of about 285° – 310° F. and is held at that temperature under pressure for about 10 seconds to about 30 seconds prior to the pressure release and separation of vapors from the slurry during the flash-off volatilization and cooling of the slurry.

* * * * *